(12) United States Patent
Nagayama

(10) Patent No.: US 8,321,042 B2
(45) Date of Patent: Nov. 27, 2012

(54) AUDIO SYSTEM

(75) Inventor: Koji Nagayama, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1234 days.

(21) Appl. No.: 11/846,256

(22) Filed: Aug. 28, 2007

(65) Prior Publication Data
US 2008/0255689 A1    Oct. 16, 2008

(30) Foreign Application Priority Data

Sep. 13, 2006    (JP) ................................. 2006-248029

(51) Int. Cl.
*G06F 17/00* (2006.01)
*G06F 3/00* (2006.01)

(52) U.S. Cl. .......................................... 700/94; 715/716

(58) Field of Classification Search .................... 700/94; 707/706, 722, 723, 726–734; 715/716, 727
See application file for complete search history.

(56) References Cited

U.S. PATENT DOCUMENTS

| | | | | |
|---|---|---|---|---|
| 2004/0055446 A1* | 3/2004 | Robbin et al. | ................... | 84/615 |
| 2005/0071780 A1* | 3/2005 | Muller et al. | ................. | 715/825 |
| 2005/0286481 A1* | 12/2005 | Fadell | ........................... | 370/342 |
| 2006/0168340 A1* | 7/2006 | Heller et al. | ................... | 709/242 |
| 2006/0171682 A1 | 8/2006 | Komano et al. | | |
| 2007/0055654 A1* | 3/2007 | Robbin et al. | ..................... | 707/3 |
| 2008/0008331 A1* | 1/2008 | Tomono et al. | .................. | 381/80 |

FOREIGN PATENT DOCUMENTS

| | | |
|---|---|---|
| JP | 2000-285660 | 10/2000 |
| JP | 2002-175685 | 6/2002 |
| JP | 2006-048867 | 2/2006 |
| JP | 2006-196058 | 7/2006 |

* cited by examiner

*Primary Examiner* — Jesse Elbin
(74) *Attorney, Agent, or Firm* — Brinks Hofer Gilson & Lione

(57) ABSTRACT

In one aspect of the present invention, an audio system connectable to a portable audio player for playing audio contents includes an audio content narrowing unit for narrowing the audio contents stored in the connected portable audio player down to a processing target audio content according to an attribute of the audio content selected by a user, a preset information registering unit for registering, in response to a user preset registration operation, a procedure of the narrowing performed by the audio content narrowing unit as preset information, and a preset playback controlling unit for performing, in response to a user preset playback operation, a narrowing procedure equivalent to the procedure of the narrowing that is registered as the preset information, and causing the portable audio player to play back the audio content narrowed down from the audio contents stored in the connected portable audio player.

20 Claims, 6 Drawing Sheets

AUDIO SYSTEM

RELATED APPLICATIONS

The present application claims priority to Japanese Patent Application Number 2006-248029, filed Sep. 13, 2006, the entirety of which is hereby incorporated by reference.

BACKGROUND OF THE INVENTION

1. Field of the Invention

The present invention relates to audio systems connectable to portable audio players (also referred to as "portable music players") that record audio files containing audio data of songs on an internal hard disk drive (HDD) or a semiconductor memory and that play back the recorded audio files to produce audio signals.

2. Description of the Related Art

Audio systems are connectable to portable audio players that record audio files of songs on an internal HDD or a semiconductor memory and that play back the recorded audio files to produce audio signals. As examples of such audio systems, the following audio systems are known (for example, see Japanese Unexamined Patent Application Publication Nos. 2002-175685 and 2006-48867). These audio systems include a connector for connecting to a portable audio player, a display device, an input device, and an audio output unit, such as a speaker and an audio amplifier. The audio systems receive user operations performed on the portable audio player connected to the connector through user interfaces, which are provided using the display device and the input device. The audio systems also cause the portable audio player to play back an audio file of a song instructed to be played back by a user using the user interface. In addition, the audio systems produce, from the audio output unit, an audio signal of the song that is supplied to the connector in response to the playback.

In addition, as a technique for such audio systems that handle audio files, an on-vehicle audio system that creates and stores a list of favorites in which audio files selected by a user from audio files stored in an internal HDD are registered and that allows a user to utilize the audio files using the list of favorites is known (for example, see Japanese Unexamined Patent Application Publication No. 2000-285660).

The following problems exist in an audio system connectable to a portable audio player when a user wishes to play back audio data in an audio file of a specific song among those stored in the portable audio player directly from a list of favorites or a keyboard shortcut of the audio system.

First, audio systems generally do not have direct access to a file system that manages audio files in portable audio players. Thus, the audio system may be incapable of loading an audio file of a song specified by a user into the audio system, or acquiring a path to the audio file of the song specified by the user on the file system. For this reason, the audio system cannot register audio files stored in the portable audio player in a list of favorites or a keyboard shortcut thereof and cannot handle the audio files directly.

Second, a plurality of portable audio players may be selectively connected to an audio system. An error may occur in the case that a list of favorites or a keyboard shortcut, which is created for one portable audio player, is executed when another portable audio player is connected to the audio system.

SUMMARY OF THE INVENTION

Accordingly, it is an object of the present invention to enable users to register audio files of specific songs among those stored in a portable audio player in a list of favorites or a keyboard shortcut of an audio system, and to utilize the audio files in an audio system that is connectable to portable audio players.

To achieve the foregoing object, according to an aspect of the present invention, an audio system connectable to a portable audio player that stores audio files, or both audio files and playlists of the audio files, as audio contents, and that plays back the stored audio contents, includes: an audio content narrowing unit configured to narrow the audio contents stored in the connected portable audio player down to a processing target audio content in accordance with an attribute of the audio content selected by a user; a preset information registering unit configured to register, in response to a user preset registration operation, a narrowing procedure performed by the audio content narrowing unit as preset information; and a preset playback controlling unit configured to perform, in response to a user preset playback operation, a narrowing procedure equivalent to the narrowing procedure that is registered as the preset information, and to cause the portable audio player to play back the audio content narrowed down from the audio contents stored in the connected portable audio player.

According to such an audio system, the procedure of narrowing the audio content performed by the user using the attribute of the audio content is registered as the preset information used for specifying the audio content to be played back in response to the preset playback operation. In response to the preset playback operation, the portable audio player is caused to play back the audio content narrowed down by performing the same narrowing procedure as that registered as the preset information. Accordingly, even if the audio system cannot directly access the audio contents, the user can easily set a desired audio content narrowed down using the attribute of the audio content as the audio content to be played back with the preset playback operation, and can utilize the audio content as long as the audio system has a function to narrow down the audio contents using the attribute of the audio content and a function to cause the portable audio player to play back the audio content.

Here, the above-described audio system may further include a playback controlling unit configured to cause, in response to a user playback start operation, the portable audio player to play back the processing target audio content narrowed down by the audio content narrowing unit.

In addition, more specifically, in the above-described audio system, the audio content narrowing unit may accept a selection regarding an attribute of a song as the selection regarding the attribute of the audio content from a user, and narrow the audio files stored in the connected portable audio player down to an audio file that contains audio data of a song having the selected attribute so as to set the narrowed audio file as the processing target audio content. In this case, the attribute of the song may include at least one of a musical genre to which the song belongs, an artist name of the song, a title of an album including the song, and a title of the song.

Further, in the above-described audio system, the audio content narrowing unit may accept a selection regarding a name of a playlist as the selection regarding the attribute of the audio content from a user, and narrow the playlists stored in the connected portable audio player down to a playlist having the selected playlist name so as to set the narrowed playlist as the processing target audio content.

To achieve the foregoing object, according to another aspect of the present invention, an audio system connectable to a portable audio player that stores audio files, or both audio files and playlists of the audio files, as audio contents, and that plays back the stored audio contents, includes: a playback controlling unit configured to cause the connected portable audio player to play back the audio contents; a preset information registering unit configured to register, in response to a user preset registration operation, an attribute of an audio content currently played back by the connected portable audio player as preset information; and a preset playback controlling unit configured to cause, in response to a user preset playback operation, the connected portable audio player to play back an audio content having the attribute that is registered as the preset information.

According to such an audio system, the attribute of the audio content that is being played back at the time the user performs the preset registration operation is used as the preset information for specifying the audio content to be played back in response to the preset playback operation. In response to the preset playback operation, the portable audio player is caused to play back the audio content having the attribute that is registered as the preset information. Accordingly, even if the audio system cannot directly access the audio contents, the user can easily set an audio content currently played back as the audio content to be played back with the preset playback operation, and can utilize the audio content as long as the audio system has a function to acquire the attribute of the audio content currently played back and a function to cause the portable audio player to play back the audio content having the specific attribute.

Here, more specifically, in the above-described audio system, the preset information registering unit may register, in response to the user preset registration operation, an attribute of a song whose audio data is contained in the audio file currently played back by the portable audio player as the attribute that is registered as the preset information. The preset playback controlling unit may cause, in response to the user preset playback operation, the portable audio player to play back an audio file that contains audio data of a song having the attribute that is registered as the preset information.

Further, in the above-described audio system, the preset information registering unit may register, in response to the user preset registration operation that is performed while the portable audio player is playing back a playlist, a name of the playlist currently played back by the portable audio player as the attribute that is registered as the preset information. The preset playback controlling unit may cause, in response to the user preset playback operation, the portable audio player to play back a playlist having the name that is registered as the preset information.

To achieve the foregoing object, according to still another aspect of the present invention, an audio system connectable to a plurality of portable audio players that store audio files, or both audio files and playlists of the audio files, as audio contents, and that play back the stored audio contents, includes: a preset information storing unit configured to store, for each of the plurality of portable audio players connected to the audio system, preset information in which content identification information that specifies a specific audio content stored in the portable audio player is registered in association with player identification information that specifies the portable audio player; a connected player identifying unit configured to identify the portable audio player connected to the audio system; a preset registering unit configured to associate, in response to a user preset registration operation, the content identification information that specifies the audio content selected by a user from the audio contents stored in the connected portable audio player with the player identification information that specifies the connected portable audio player identified by the connected player identifying unit, and to register the content identification information and the associated player identification information in the preset information; and a preset playback controlling unit configured to cause, in response to a user preset playback operation, the connected portable audio player to play back an audio content specified by the content identification information that is registered in the preset information in association with the player identification information that specifies the portable audio player identified by the connected player identifying unit.

With such a configuration, when the plurality of portable audio players can be connected to the audio system and selectively utilized, the user of the audio system can easily set the audio content to be played back in response to the preset playback operation for each portable audio player, and can utilize the audio content.

Here, preferably, the above-described audio system may further include a user identifying unit configured to identify a user currently using the audio system. The preset information storing unit may store, for each user of the audio system, the preset information in association with user identification information that specifies the user. The preset registering unit may associate, in response to the user preset registration operation, the content identification information that specifies the audio content selected by the user from the audio contents stored in the connected portable audio player with the player identification information that specifies the portable audio player identified by the connected player identifying unit, and may register the content identification information and the associated player identification information in the preset information in association with the user identification information that specifies the user identified by the user identifying unit. The preset playback controlling unit may cause, in response to the user preset playback operation, the connected portable audio player to play back the audio content specified by the content identification information registered in association with the player identification information that specifies the portable audio player identified by the connected player identifying unit in the preset information that is associated with the user identification information that specifies the user identified by the user identifying unit.

With such a configuration, each user of the audio system can independently set the audio content to be played back in response to the preset playback operation for each portable audio player, and can utilize the audio content.

To achieve the foregoing object, according to a further aspect of the present invention, an audio system connectable to a portable audio player that stores audio files, or both audio files and playlists of the audio files, as audio contents, and that plays back the stored audio contents, includes: a preset information registering unit configured to register, in response to a user preset registration operation, content identification information that specifies an audio content selected by a user from the audio contents stored in the connected portable audio player as preset information; a preset playback controlling unit configured to cause, in response to a user preset playback operation, the connected portable audio player to play back an audio content specified by the content identification information that is registered as the preset information; and a preset information invalidating unit configured to invalidate the preset information in the case that the audio contents stored in the connected portable audio player have changed.

With such a configuration, it is possible to prevent an error, caused because the audio contents stored in the portable audio player have changed while the portable audio player is not connected to the audio system, and the portable audio player is incapable of playing back the audio content, whose identification information is registered as the preset information, in response to the preset playback operation, from occurring in advance.

Additionally, each of the above-described audio systems may be mounted in a vehicle.

As described above, according to these aspects of the present invention, the user can register the audio file of a specific song among the audio files stored in the portable audio player in a list of favorites or a keyboard shortcut stored in the audio system, and can utilize the audio content with the audio system that is connectable to the portable audio player and that allows the utilization of the portable audio player.

DESCRIPTION OF THE PREFERRED EMBODIMENTS

Embodiments of the present invention will be described below in an exemplary application to an audio system to be mounted in a vehicle (an in-vehicle audio system).

Figure 1:
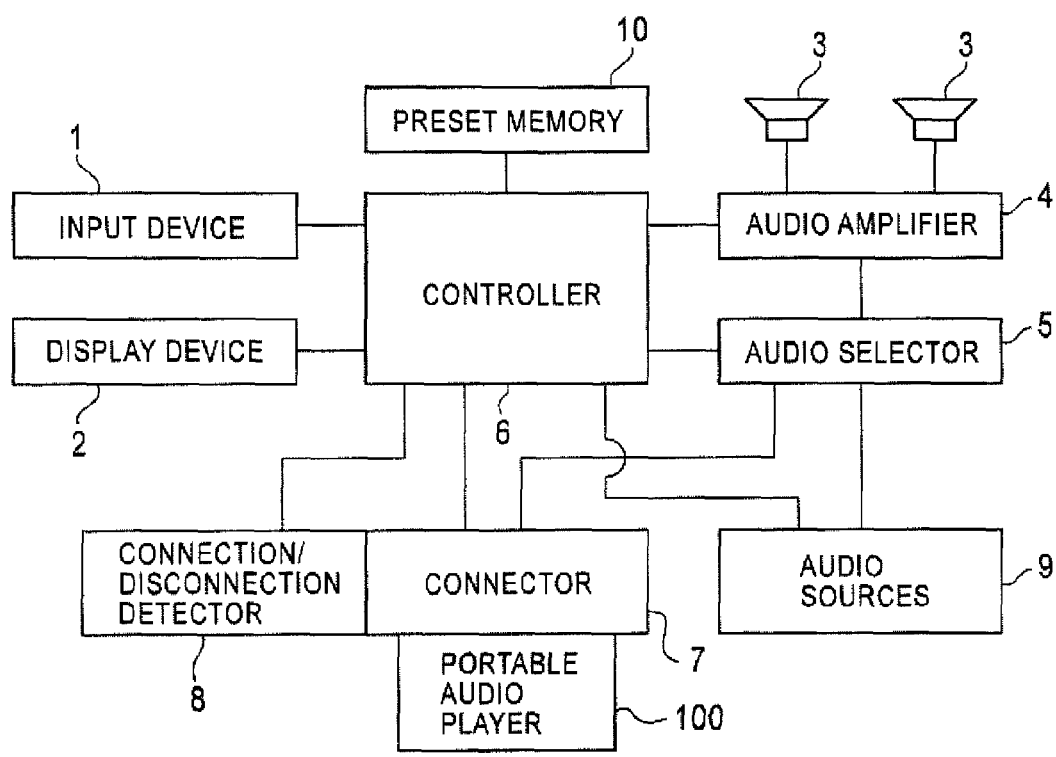
FIG. 1 is a block diagram illustrating a configuration of an audio system according to an embodiment of the present invention.

FIG. 1 illustrates a configuration of an audio system according to an embodiment of the present invention.

As illustrated in the figure, the audio system includes an input device 1 equipped with a plurality of keys, a display device 2, speakers 3, an audio amplifier 4, an audio selector 5, a controller 6, a connector 7, a connection/disconnection detector 8, one or more audio sources 9, and a preset memory 10. The display device 2 may be a liquid crystal display (LCD). The audio amplifier 4 has an audio signal equalization function and an audio sign al amplification function. The connector 7 allows connection and disconnection of a portable audio player 100. The connection/disconnection detector 8 detects connection and disconnection of the portable audio player 100 to and from the connector 7. The audio sources 9 may be a radio receiver, a compact disc (CD) player, or the like. The preset memory 10 may be constituted by a non-volatile memory.

In such a configuration, the controller 6 accepts various user operations through user interfaces that are provided using the input device 1 and the display device 2, and controls each unit.

More specifically, in response to a user output source selection operation, the controller 6 sets one of the portable audio player 100 and the audio sources 9 as an output source device, and causes the audio selector 5 to provide, to the audio amplifier 4, an audio signal from the output source device. In addition, in response to a user playback control operation, the controller 6 controls a playback operation of the output source device. In response to a user volume adjustment operation and a tone quality adjustment operation, the controller 6 controls characteristics of the equalization function and the amplification function of the audio amplifier 4. The audio amplifier 4 performs an equalization operation or an amplification operation having characteristics according to the control of the controller 6 on the audio signal from the audio selector 5, and provides an audio signal to the speakers 3.

The portable audio player 100 stores a plurality of audio files and playlists. When not connected to the connector 7, the portable audio player 100 plays back the audio data in the stored playlists or audio files in response to a user operation performed on an operation unit included therein, and produces the audio signal. On the other hand, when connected to the connector 7, the playback operation of the stored playlist or audio file performed by the portable audio player 100 is controlled according to a command that is issued from the controller 6 through the connector 7. During the playback operation of the audio file at the time of connection, the portable audio player 100 provides the reproduced audio signal to the audio selector 5 through the connector 7. In addition, in response to a request from the controller 6, the portable audio player 100 provides the controller 6 with information on the stored playlists and tag information of the audio files as menu information when connected to the connector 7. Here, the tag information of an audio file includes a genre, an artist name, an album title, and a title of song whose audio data is contained in the audio file.

On the other hand, in response to a search menu call request, the controller 6 acquires the above-described menu information from the portable audio player 100, and displays a search menu on the display device 2 on the basis of the acquired menu information. Here, the search menu call request may be issued at the time that the portable audio player 100 is set as the output source device, or at the time that a user performs a menu call operation on the input device 1 when the portable audio player 100 is set as the output source device. The controller 6 accepts an operation for selecting a playlist or an audio file on the displayed search menu. Upon accepting a playback start operation, the controller 6 issues, to the portable audio player 100, a command for requesting playback of the playlist or the audio file selected with the selection operation. Upon receiving the command for requesting playback of the playlist or the audio file, the portable audio player 100 performs the playback operation of each audio file registered in the requested playlist or of a requested audio file.

Figure 2A:
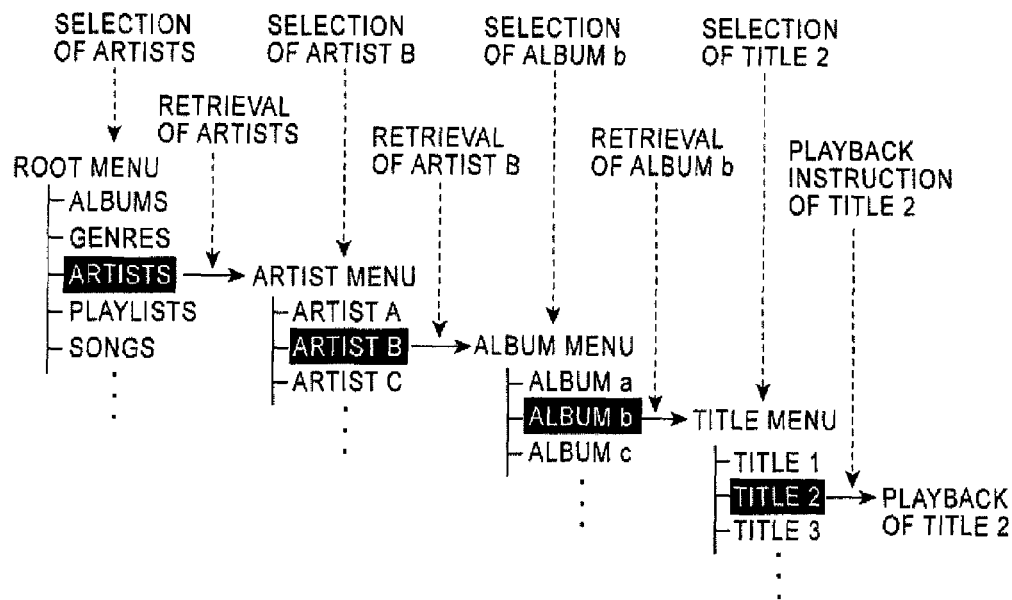
FIGS. 2A and 2B are diagrams illustrating search menus provided by an audio system according to an embodiment of the present invention.

FIG. 2A illustrates an example of accepting a user playback operation of a playlist or an audio file stored in the portable audio player 100 using the above-described search menu.

In the illustrated example, a layered search menu is provided. In this example, in response to a search menu call, the controller 6 first displays a root menu, which includes menu items such as "ALBUMS", "GENRES", "ARTISTS", "PLAYLISTS", "SONGS", and so forth. Upon a user performing an operation for selecting the menu item "ARTISTS" on the root menu, the controller 6 performs an operation of "selection of ARTISTS" to cause a state in which the menu item "ARTISTS" is selected. Upon the user performing a determination operation with the menu item "ARTISTS" being selected, the controller 6 performs an operation of "retrieval of ARTISTS" to display an artist menu. The artist menu contains, as its menu items, artist names (such as "ARTIST A", "ARTIST B", and "ARTIST C" in the figure), which are contained in the tag information of the audio files stored in the portable audio player 100. Upon the user performing an operation for selecting the menu item "ARTIST B" on the artist menu, the controller 6 performs an operation of "selection of ARTIST B" to cause a state in which the menu item "ARTIST B" is selected. Upon the user performing a determination operation with the menu item "ARTIST B" being selected, the controller 6 performs an operation of "retrieval of ARTIST B" to display an album menu. The album menu contains, as its menu items, album titles (such as "ALBUM a", "ALBUM b", and "ALBUM c" in the figure), which are contained in the tag information of the audio files stored in the portable audio player 100 together with "ARTIST B".

Upon the user performing an operation for selecting "ALBUM b" on the album menu, the controller 6 performs an operation of "selection of ALBUM b" to cause a state in which the menu item "ALBUM b" is selected. Upon the user performing a determination operation with the menu item "ALBUM b" being selected, the controller 6 performs an operation of "retrieval of ALBUM b" to display a title menu. The title menu contains, as its menu items, song titles (such as "TITLE 1", "TITLE 2", and "TITLE 3" in the figure), which are contained in the tag information of the audio files stored in the portable audio player 100 together with "ARTIST B" and "ALBUM b". Upon the user performing an operation for selecting the menu item "TITLE 2" on the title menu, the controller 6 performs an operation of "selection of TITLE 2" to cause a state in which the menu item "TITLE 2" is selected. Upon the user performing a playback start operation with the menu item "TITLE 2" being selected, the controller 6 performs an operation of "playback instruction of TITLE 2" to issue a command for requesting playback of an audio file corresponding to "TITLE 2" displayed on the title menu to the portable audio player 100. The portable audio player 100 plays back the audio file corresponding to "TITLE 2" in response to this command. The tag information of the audio file corresponding to "TITLE 2" on the title menu contains "ARTIST B", "ALBUM b", and "TITLE 2".

Additionally, if the audio system accepts a playback start operation from a user with the above-described root menu, artist menu, or album menu being displayed, the controller 6 issues, to the portable audio player 100, a command for requesting playback of an audio file corresponding to a menu item that is being selected on the search menu at that time, thereby playing back the audio file corresponding to the menu item. More specifically, for example, if the audio system accepts a playback start operation from the user with the menu item "ALBUM b" being selected on the album menu, the controller 6 issues, to the portable audio player 100, a command for requesting playback of audio files corresponding to "ALBUM b" on the album menu. The tag information of the audio files corresponding to "ALBUM b" on the album menu to be played back by the portable audio player 100 in response to this command contains "ARTIST B" and "ALBUM b". Furthermore, for example, if the audio system accepts the playback start operation from the user with the menu item "ARTIST B" being selected on the artist menu, the controller 6 issues, to the portable audio player 100, a command for requesting playback of audio files corresponding to "ARTIST B" on the artist menu. The tag information of each of the audio files corresponding to the "ARTIST B" on the artist menu to be played back by the portable audio player 100 in response to this command contains "ARTIST B".

Figure 2B:
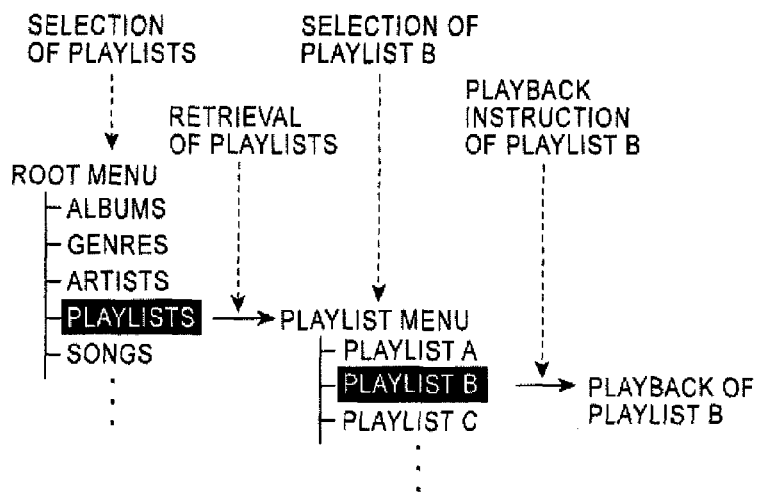

FIG. 2B illustrates another example of accepting a user playback operation using the search menu illustrated in FIG. 2A.

This example shows a case that a user performs an operation for selecting "PLAYLISTS" on the root menu. In this case, in response to a user operation for selecting "PLAYLISTS", the controller 6 performs an operation of "selection of PLAYLISTS" to cause a state in which the menu item "PLAYLISTS" is selected. Upon the user performing a determination operation with the menu item "PLAYLISTS" being selected, the controller 6 performs an operation of "retrieval of PLAYLISTS" to display a playlist menu. The playlist menu contains, as its menu items, playlist names (such as "PLAYLIST A", "PLAYLIST B", and "PLAYLIST C" in the figure) of playlists stored in the portable audio player 100. Upon the user performing an operation for selecting the menu item "PLAYLIST B" on the playlist menu, the controller 6 performs an operation of "selection of PLAYLIST B" to cause a state in which the menu item "PLAYLIST B" is selected. Upon the user performing the playback start operation with the menu item "PLAYLIST B" being selected, the controller 6 performs an operation of "playback instruction of PLAYLIST B" to issue a command for requesting playback of a playlist corresponding to "PLAYLIST B" displayed on the playlist menu. The playlist corresponding to "PLAYLIST B" on the playlist menu to be played back by the portable audio player 100 in response to this command has a playlist name of "PLAYLIST B".

The controller 6, in cooperation with the portable audio player 100, manages associations between menu items of each menu constituting the search menu and audio files or playlists corresponding to the menu items.

More specifically, for example, the portable audio player 100 defines menu items to be displayed in the provided menu information, and also manages the association between each menu item and the audio file or the playlist corresponding to the menu item at the time of providing the menu information. The controller 6 specifies a menu item in a command for requesting playback of the audio file corresponding to the menu item. The portable audio player 100 then plays back the audio file or the playlist managed in association with the menu item specified by the command. In addition, for example, the controller 6 may specify a condition to be met by the audio file or the playlist corresponding to the menu item in the command for requesting playback of the audio file corresponding to the menu item. For example, the condition may be an artist name, an album title, or a song title that should be contained in the tag information of the audio file to be played back, or a playlist name of the playlist to be played back. The portable audio player 100 then retrieves the audio file or the playlist that satisfies the condition on the tag information or on the playlist name specified by the command, and plays back the audio file or the playlist.

The controller 6 may acquire the menu information (e.g., information on the playlists stored in the portable audio player 100 and the tag information of audio files stored in the portable audio player 100) used for creation of the above-described search menu from the portable audio player 100 at the time that the portable audio player 100 is connected thereto.

Alternatively, the controller 6 may acquire the menu information regarding the menu to be displayed from the portable audio player 100 each time the controller 6 starts displaying each menu constituting the search menu. More specifically, in this case, the controller 6 issues an artist retrieval request to the portable audio player 100 in the operation of "retrieval of ARTISTS" described in FIG. 2A, for example. Upon receiving the retrieval request, the portable audio player 100 returns, as the menu information, artist names contained in the tag information of the stored audio files. The controller 6 then creates the above-described artist menu on the basis of the returned menu information, and displays the created artist menu. In addition, in the above-described operation of "retrieval of ARTIST B", the controller 6 issues, to the portable audio player 100, a retrieval request having "ARTIST B" set as a retrieval key. Upon receiving the retrieval request, the portable audio player 100 retrieves tag information that contains "ARTIST B" among the tag information of the stored audio files, and returns, as the menu information, album titles contained in the retrieved tag information. The controller 6 creates the above-described album menu on the basis of the returned menu information, and displays the created album menu.

Additionally, in the above-described operation of "retrieval of ALBUM b", the controller 6 issues, to the portable audio player 100, a retrieval request having "ARTIST B" and "ALBUM b" set as retrieval keys. Upon receiving the retrieval request, the portable audio player 100 retrieves tag information that contains "ARTIST B" and "ALBUM b" among the tag information of the stored audio files, and returns, as the menu information, song titles contained in the retrieved tag information. The controller 6 creates the above-described title menu on the basis of the returned menu information, and displays the created title menu. Furthermore, in the operation of "retrieval of PLAYLISTS" described in FIG. 2B, the controller 6 issues a playlist retrieval request to the portable audio player 100. Upon receiving the retrieval request, the portable audio player 100 returns, as the menu information, a playlist name of each of the stored playlists. The controller 6 creates the above-described playlist menu on the basis of the returned menu information, and displays the created playlist menu.

The menu items of the root menu may be fixed. In such a case, the controller 6 may prestore fixed menu information representing these menu items of the root menu, and may be configured not to acquire this menu information from the portable audio player 100.

In each of the following figures, the portable audio player 100 is abbreviated as "PAP" for convenience.

Figure 3:
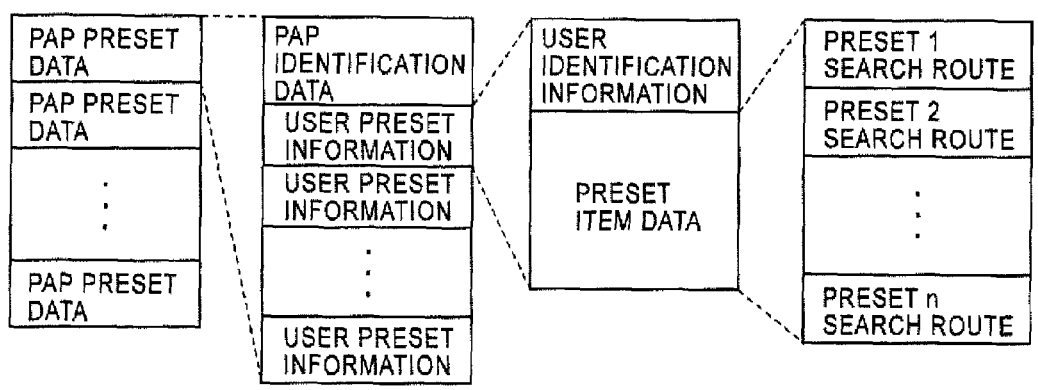
FIG. 3 is a diagram illustrating a PAP preset table stored in an audio system according to an embodiment of the present invention.

FIG. 3 illustrates a PAP preset table to be registered in the preset memory 10 according to an embodiment of the present invention.

As illustrated in the figure, a PAP preset table has PAP preset data, provided in association with each portable audio player that has been connected to the audio system. Each PAP preset data contains PAP identification data and user preset information. The PAP identification data may be an identifier of the corresponding portable audio player 100. The user preset information is provided in association with each user of the audio system.

User identification information that serves as an identifier of the corresponding user and preset item data are registered in the user preset information. A preset i search route, where i represents a preset number from 1 to n, can be registered as the preset item data.

A description will be given below for a preset playback operation of an audio file performed in such an audio system. The controller 6 performs a PAP preset setting operation, a PAP preset registration operation, and a PAP preset playback operation in order to perform this preset playback operation of the audio file.

The PAP preset setting operation will be described first. This PAP preset setting operation is executed at the time of booting of the audio system or connection of the portable audio player 100 to the connector 7. In the PAP preset setting operation, the preset item data that corresponds to the connected portable audio player 100 and a user of the audio system is set as current preset item data.

Figure 4:
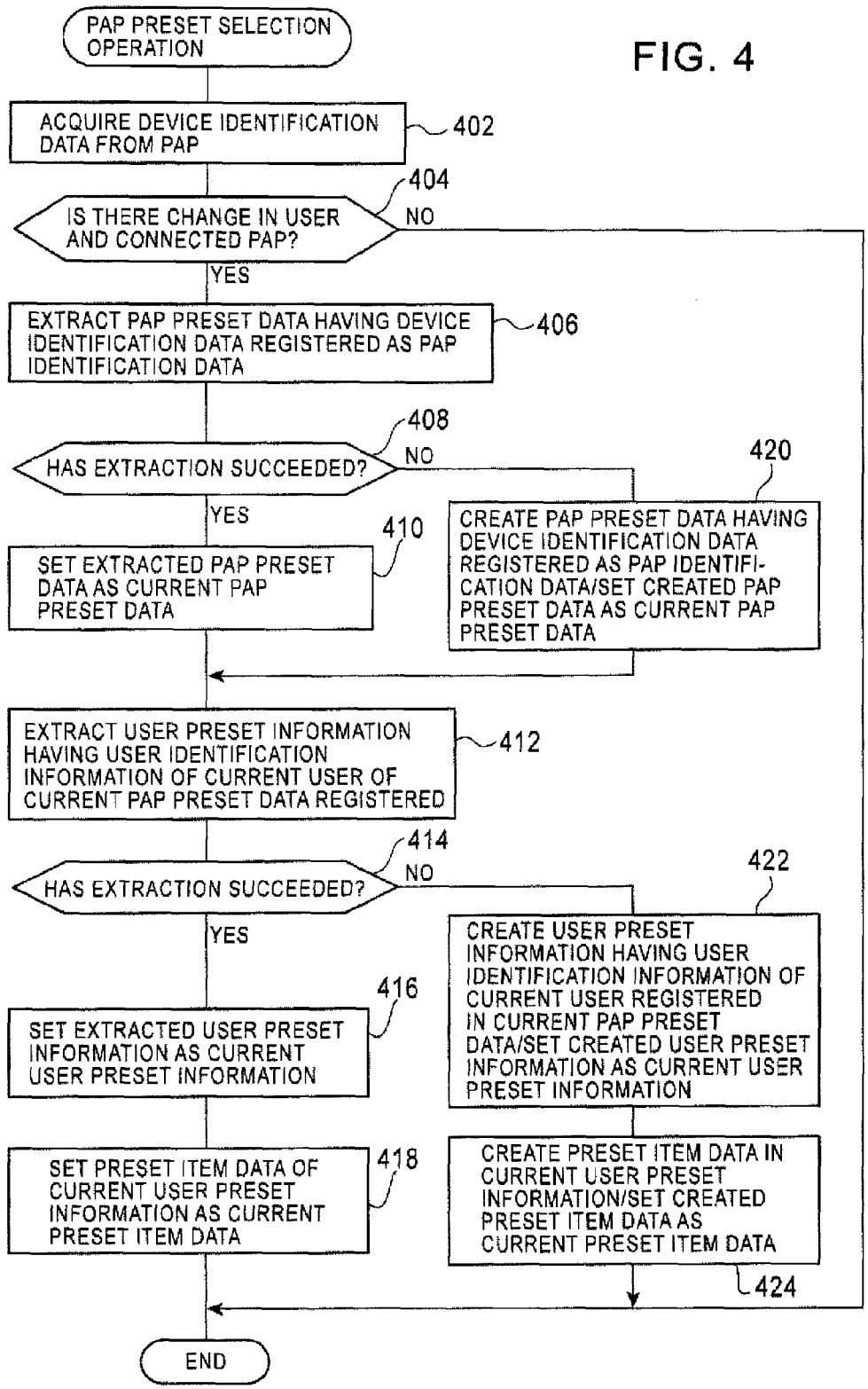
FIG. 4 is a flowchart illustrating a PAP preset setting operation according to an embodiment of the preset invention.

FIG. 4 illustrates a procedure of this PAP preset setting operation. As illustrated in the figure, in this PAP preset setting operation, the controller 6 first acquires device identification data from the portable audio player 100 that is connected to the connector 7 (STEP 402). A serial number of the portable audio player 100 or a name of the portable audio player 100 set by a user for the portable audio player 100 may be used as this device identification data.

After acquiring the device identification data at STEP 402, the controller 6 identifies a combination of the current user of the audio system and the currently connected portable audio player 100, and determines whether the identified combination is the same as that used when the processing of STEP 404 was performed last time (STEP 404).

Here, for the determination performed at STEP 404, the controller 6 stores the combination of the identified current user of the audio system and the identified currently connected potable audio player 100 at STEP 404 of the PAP preset setting operation.

In addition, the controller 6 identifies the current user of the audio system at STEP 404 through a user authentication operation performed at the time of booting of the audio system. In the user authentication operation, a user is authenticated using a password or the like entered by the user with the input device 1. Additionally, the controller 6 may identify the user utilizing a user authentication function that is installed in a vehicle in which the audio system is mounted, such as a user authentication function for authenticating a user using an ignition key or a remote key. In addition, the controller 6 identifies the currently connected portable audio player 100 at STEP 404 using the device identification data acquired at STEP 402. In this case, if the connection/disconnection detector 8 does not detect disconnection of the portable audio player 100 from the connector 7 after the last execution of the processing of STEP 404, the controller 6 may unconditionally identify that the currently connected portable audio player 100 is the same portable audio player 100 as that connected at the time of the last execution of the processing of STEP 404. The connection/disconnection detector 8 detects connection or disconnection of the portable audio player 100 to or from the connector 7 even while the audio system is powered off, and holds the detection result. This detection of connection or disconnection can be performed, for example, by detecting a change in electric resistance across terminals of the connector 7 caused by the absence or existence of the connection of the portable audio player 100.

If the combination of the current user of the audio system and the currently connected portable audio player 100 is determined, at STEP 404, to differ from that used at the time of the last execution of the processing of STEP 404, the controller 6 first extracts, from the PAP preset table stored in the preset memory 10, the PAP preset data having the device identification data acquired at STEP 402 registered as the PAP identification data (STEP 406). The controller 6 then sets the extracted PAP preset data as current PAP preset data (STEP 410). The controller 6 extracts, from the current PAP preset data, user preset information having the user identification information that indicates the current user of the audio system registered at STEP 404 (STEP 412). The controller 6 then sets the extracted user preset information as current user preset information (STEP 416), and sets the preset item data of the current user preset information as current preset item data (STEP 418).

At STEP 418, the controller 6 may determine whether the contents recorded in the currently connected portable audio player 100 have changed compared with the contents at the time of the last execution of the processing of STEP 418. If the contents have changed, the controller 6 may set the current preset item data after clearing the content of the preset item data of the current user preset information. With this configuration, the occurrence of an error during the execution of retrieval can be prevented in advance when the retrieval cannot be performed using the preset i search route that is registered in the current preset item data due to the change in the contents recorded in the connected portable audio player 100. The retrieval using the preset i search route will be described later.

The change in the contents recorded in the portable audio player 100 may be determined using the recorded contents of the portable audio player 100 or a characteristic value thereof. For example, consistency of the playlists recorded in the portable audio player 100, consistency of tag information, including a download date of files of a specific kind, stored in the portable audio player 100, and consistency of information of an audio file, which was stored the last time in the portable audio player 100, registered in the portable audio player 100 may be used. For this determination, the controller 6 stores the current recorded content of the connected portable audio player 100 or the characteristic value thereof that was used for the determination this time at STEP 418.

If the PAP preset data in which the device identification data acquired at STEP 402 is registered as the PAP identification data does not exist (STEP 408), the controller 6 creates new PAP preset data, in which the acquired device identification data is registered as the PAP identification data, in the PAP preset table. The controller 6 then sets the created PAP preset data as the current PAP preset data (STEP 420). In addition, if the user preset information having the user identification information indicating the current user of the audio system identified at STEP 404 is not registered in the current PAP preset data (STEP 414), the controller 6 creates user preset information, in which the user identification information indicating the identified current user of the audio system is registered, in the current PAP preset data. The controller 6 then sets the created user preset information as the current user preset information (STEP 422). The controller 6 also creates empty preset item data in the current user preset information, and sets the created preset item data as the current preset item data (STEP 424).

On the other hand, if the combination of the current user of the audio system and the currently connected portable audio player 100 is determined, at STEP 404, to be the same as that used at the time of the last execution of the processing of STEP 404, the PAP preset setting operation is terminated without performing any further steps. As a result, the current PAP preset data, the current user preset information, and the current preset item data are maintained as they were set last time.

The PAP preset registration operation performed by the controller 6 will be described next. The PAP preset registration operation is executed while displaying the search menu illustrated in FIGS. 2A and 2B. In this operation, a preset i search route is registered in the current preset item data in response to a user operation.

Figure 5:
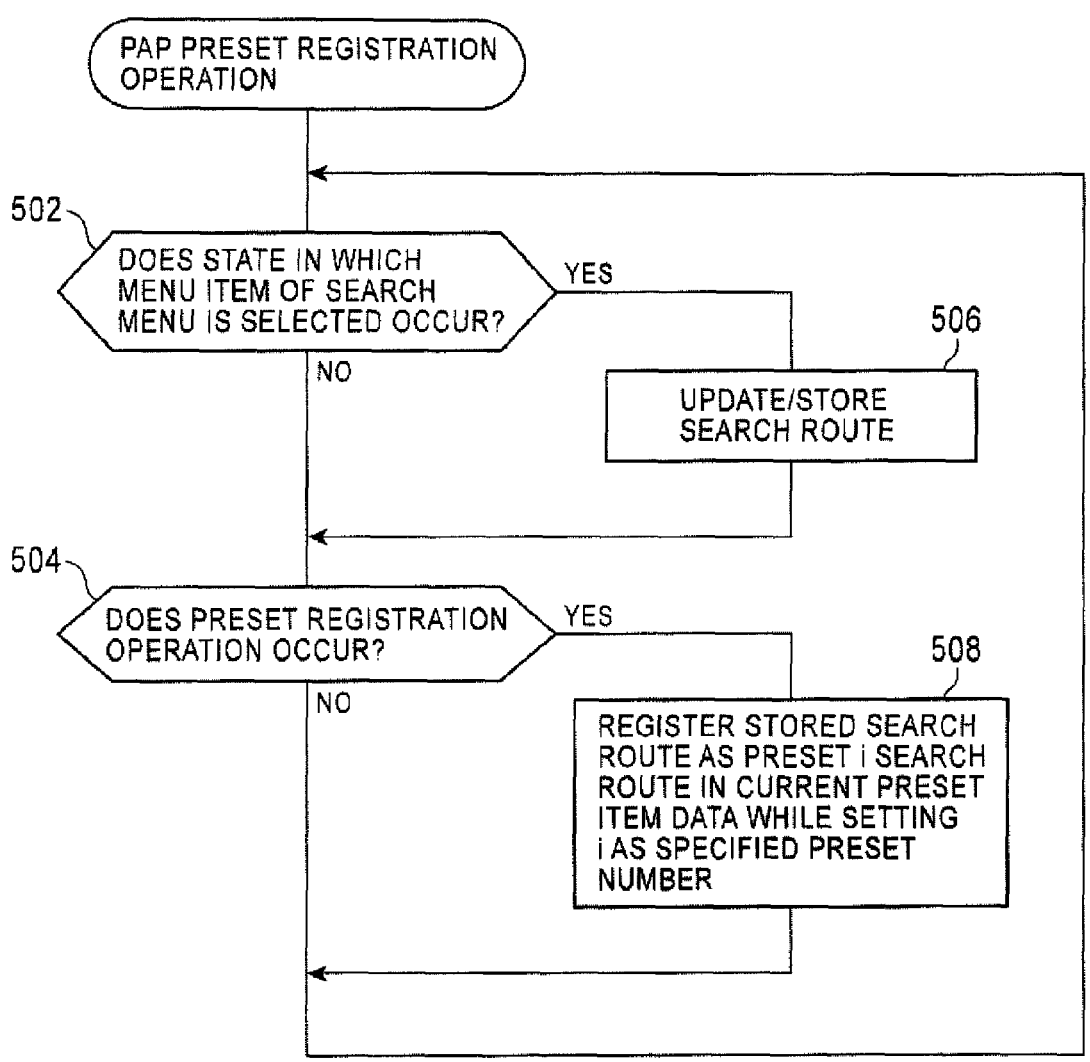
FIG. 5 is a flowchart illustrating a PAP preset registration operation according to an embodiment of the present invention.

As illustrated in FIG. 5, in this PAP preset registration operation, if any of the menu items in the search menu shown in FIGS. 2A and 2B is selected in response to a user selection operation (STEP 502), the controller 6 updates the search route to a route from the root menu to the selected menu item, and stores the search route (STEP 506).

More specifically, for example, when the menu item "ARTISTS" is selected on the root menu in response to the user selection operation as illustrated in FIG. 2A, the search route is updated to "ARTISTS". When the menu item "ARTIST B" is selected in response to the user selection operation on the artist menu that is displayed as a result of "retrieval of ART-ISTS" thereafter, the search route is updated to "ARTISTS"-"ARTIST B". When the menu item "ALBUM b" is selected in response to the user selection operation on the album menu that is displayed as a result of "retrieval of ARTIST B" thereafter, the search route is updated to "ARTISTS"-"ARTIST B"-"ALBUM b". When the menu item "TITLE 2" is selected in response to the user selection operation on the title menu that is displayed as a result of "retrieval of ALBUM b" thereafter, the search route is updated to "ARTISTS"-"ARTIST B"-"ALBUM b"-"TITLE 2".

Similarly, when the menu item "PLAYLISTS" is selected in response to the user selection operation on the root menu as illustrated in FIG. 2B, the search route is updated to "PLAYLISTS". When the menu item "PLAYLIST B" is selected in response to the user selection operation on the playlist menu that is displayed as a result of "retrieval of PLAYLISTS" thereafter, the search route is updated to "PLAYLISTS"-"PLAYLIST B".

Now, referring back to FIG. 5, in the PAP preset registration operation, if a user performs a preset registration operation with the input device 1 to specify a preset number (STEP 504), the controller 6 registers the search route stored at STEP 506 as the preset i search route in the current preset item data set by the PAP preset setting operation illustrated in FIG. 4 (STEP 508). Here, i represents the preset number specified by the user. The preset registration operation for specifying the preset number may be accepted from the user in the following manner. For example, the input device 1 may be equipped with preset keys corresponding to each preset number. In response to continuous pressing of a preset key (pressing of a key for a predetermined period of time or more), the controller 6 accepts the preset registration operation for the preset number corresponding to the continuously pressed preset key.

Through the above-described PAP preset setting operation and PAP preset registration operation, the route from the root menu to the selected menu item specified by the preset number i is registered in the current preset item data as the preset i search route by the current user of the audio system selecting the menu item on the search menu, and performing the preset registration operation with the portable audio player 100 being connected.

The PAP preset playback operation executed by the controller 6 will be described next. The PAP preset playback operation is executed when the portable audio player 100 connected to the connecter 7 is set as the output source device.

Figure 6:
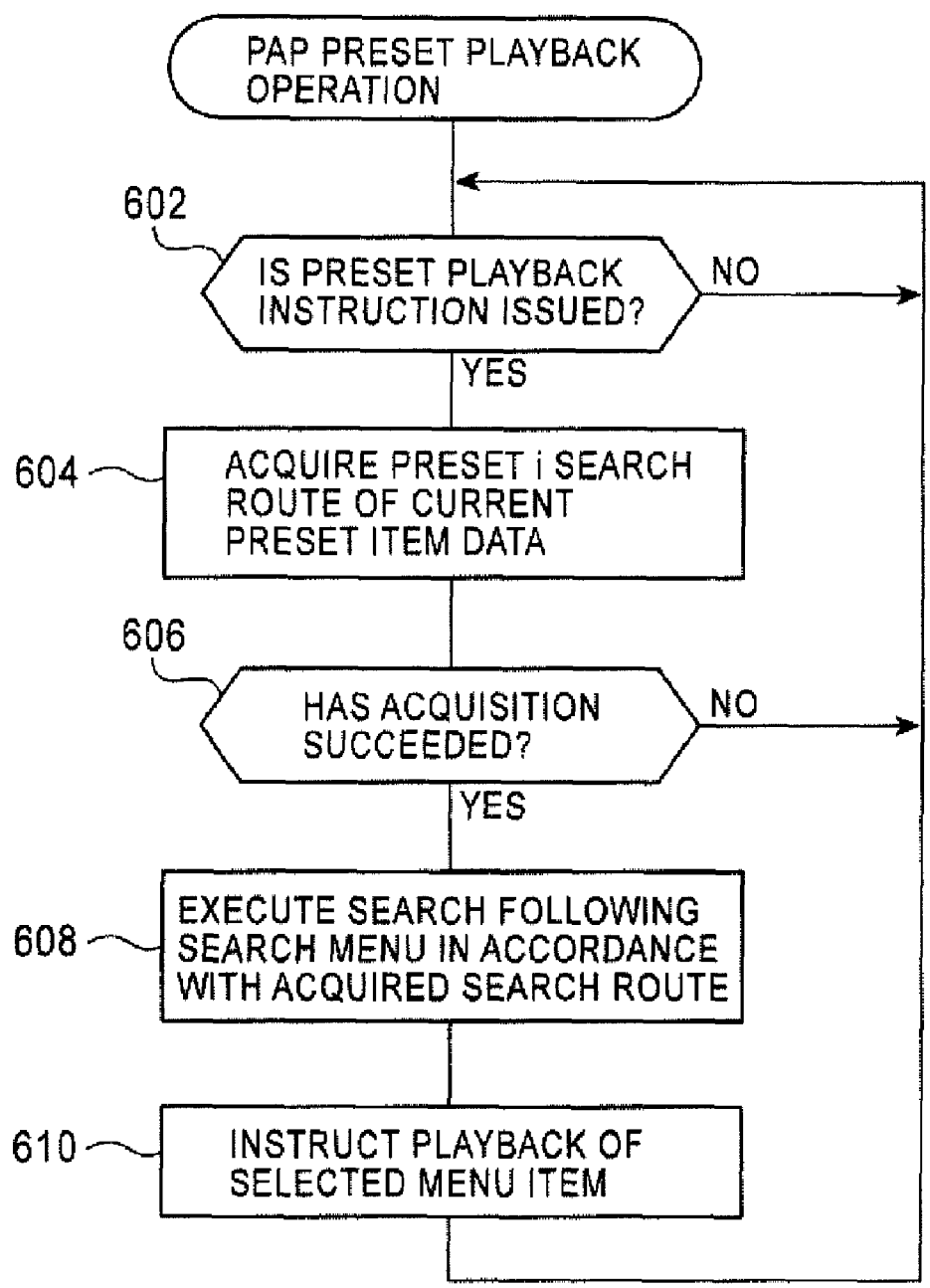
FIG. 6 is a flowchart illustrating a PAP preset playback operation according to an embodiment of the present invention.

As illustrated in FIG. 6, in this operation, the controller 6 monitors occurrence of a user preset playback instruction operation for the specified preset number (STEP 602). Upon occurrence of the preset playback instruction operation, the controller 6 acquires the preset i search route from the current preset item data while using the specified preset number as i (STEP 604). The user preset playback instruction operation for the specified preset number may be accepted in the following manner. For example, the input device 1 may be equipped with preset keys corresponding to each preset number. In response to pressing of a preset key for a short period that is not interpreted as the above-described continuous pressing, the controller 6 accepts the preset playback instruction operation for the preset number corresponding to the pressed preset key.

The controller 6 executes a search following the search menu from the root menu in accordance with the acquired preset i search route by performing the selection of a menu item and the retrieval of the selected menu item while acquiring the necessary menu information from the portable audio player 100 (STEP 608). This search is executed as a background operation without displaying the search menu on the display device 2 and accepting user operations on the search menu.

As a result, for example, when the preset i search route is set as "ARTISTS", a search for "selection of ARTISTS" described above is performed on the root menu, and the menu item "ARTISTS" is selected on the root menu. In addition, when the preset i search route is set as "ARTISTS"-"ARTIST B", searches for "selection of ARTISTS" and "retrieval of ARTISTS" on the root menu and a search for "selection of ARTIST B" on the artist menu are sequentially performed, and the menu item "ARTIST B" is selected on the artist menu. Additionally, when the preset i search route is set as "ARTISTS"-"ARTIST B"-"ALBUM b", searches for "selection of ARTISTS" and "retrieval of ARTISTS" on the root menu, searches for "selection of ARTIST B" and "retrieval of ARTIST B" on the artist menu, and a search for "selection of ALBUM b" on the album menu are sequentially performed. As a result, the menu item "ALBUM b" is selected on the album menu. Furthermore, when the preset i search route is set as "ARTISTS"-"ARTIST B"-"ALBUM b"-"TITLE 2", searches for "selection of ARTISTS" and "retrieval of ARTISTS" on the root menu, searches for "selection of ARTIST B" and "retrieval of ARTIST B" on the artist menu, searches for "selection of ALBUM b" and "retrieval of ALBUM b" on the album menu, and a search for "selection of TITLE 2" on the title menu are sequentially performed. As a result, the menu item "TITLE 2" is selected on the title menu. Moreover, when the preset i search route is set as "PLAYLISTS"-"PLAYLIST B", searches for "selection of PLAYLISTS" and "retrieval of PLAYLISTS" on the root menu and a search for "selection of PLAYLIST B" on the playlist menu are sequentially performed, and the menu item "PLAYLIST B" is selected on the playlist menu.

After performing the above-described searches, the controller 6 then performs playback of the audio file or the playlist corresponding to the selected menu item by issuing a command for requesting playback of the audio file or the playlist corresponding to the menu item selected at that time (STEP 610).

As a result, the audio file or the playlist that may be played back if the playback start operation is performed instead of the preset registration operation while the user performs the preset registration operation for the preset number i, namely, the audio file or the playlist that is selected using the search menu while the user performs the preset registration operation for the preset number i, is played back by the portable audio player 100 in response to the preset playback instruction operation for the preset number i. More specifically, if the preset i search route is set as "ARTISTS"-"ARTIST B", each audio file having the tag information that contains "ARTIST B" is played back. If the preset i search route is set as "ARTISTS"-"ARTIST B"-"ALBUM b", each audio file having the tag information that contains "ARTIST B" and "ALBUM b" is played back. If the preset i search route is set as "ARTISTS"-"ARTIST B"-"ALBUM b"-"TITLE 2", an audio file having the tag information that contains "ARTIST B", "ALBUM b", and "TITLE 2" is played back. If the preset i search route is set as "PLAYLISTS"-"PLAYLIST B", the playlist having the name "PLAYLIST B" is played back.

After performing the playback of the audio file or the playlist corresponding to the selected menu item as described above (STEP 610), the process returns to monitoring at STEP 602.

In addition, if the preset i search route is not registered in the current preset item data (STEP 606), the process directly returns to monitoring at STEP 602.

In the above-described embodiments, in response to the user preset registration operation for the preset number i during the playback of the audio file or the playlist, the controller 6 may register the tag information of the audio file currently played back or the name of the playlist currently played back in the current preset item data as a preset i item instead of the preset i search route. In response to the user preset playback start operation for the preset number i, the controller 6 may retrieve an audio file having tag information that matches the tag information registered as the preset i item in the current preset item data or a playlist having a name that matches the playlist name registered as the preset i item in the preset item data by acquiring the tag information of each audio file or the playlist name of each playlist from the portable audio player 100. The controller 6 then may cause the portable audio player 100 to play back the retrieved audio file or the playlist. Alternatively, in response to the user preset playback start operation for the preset number i, the controller 6 may provide the portable audio player 100 with the tag information or the playlist name that is registered in the current preset item data as the preset i item if possible, and may cause the portable audio player 100 to play back the audio file having the tag information that matches the provided tag information or the playlist having the name that matches the provided playlist name.

In addition, in response to the user preset registration operation for the preset number i during the playback of an audio file, the controller 6 may register an artist name or an album title contained in the tag information of the audio file currently played back in the current preset item data as the preset i item instead of the preset i search route. In response to the user preset playback start operation for the preset number i, the controller 6 may cause the portable audio player 100 to play back each audio file having tag information containing the artist name that matches the artist name registered in the current preset item data as the preset i item or each audio file having tag information containing the album title that matches the album title registered in the current preset item data as the preset i item.

As described above, the embodiments of the present invention allow users to easily set desired audio files or playlists, such as audio files or playlists that are narrowed down using the search menu, or an audio file or a playlist currently played back, as audio files or playlists to be played back by the audio system in response to the preset playback instruction operation, and to utilize the audio files or the playlists, even if the audio system does not have direct access to the audio files or the playlists stored in the connected portable audio player 100.

Additionally, the embodiments of the present invention allow users to easily set audio contents to be played back for each portable audio player 100 and to utilize the audio contents through the preset playback instruction operation in the case that a plurality of portable audio players 100 are connected to the audio system and are selectively utilized. In addition, in the case that a plurality of users use the audio system, the embodiments of the present invention allow each of the users to independently set audio contents to be played back for each portable audio player 100 and to utilize the audio contents through the preset playback instruction operation.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An audio system connectable to a portable audio player that stores audio files or both audio files and playlists of the audio files as audio contents, and that plays back the stored audio contents, the audio system receiving menu information of audio contents in a connected portable audio player and comprising:
   an audio content narrowing unit configured to narrow the audio contents stored in a portable audio player connected to the audio system down to a processing target audio content in accordance with an attribute of the audio content selected by a user and based on menu information received by the audio system from the connected portable audio player;
   a preset information registering unit configured to register, in response to a user preset registration operation, the narrowing procedure performed by the audio content narrowing unit as preset information; and
   a preset playback controlling unit configured to perform, in response to a user preset playback operation, a narrowing procedure equivalent to the narrowing procedure that is registered as the preset information, and to cause the portable audio player connected to the audio system to play back the audio content narrowed down from the audio contents stored in the connected portable audio player.

2. The audio system according to claim 1, further comprising:
   a playback controlling unit configured to cause, in response to a user playback start operation, the portable audio player to play back the processing target audio content narrowed down by the audio content narrowing unit.

3. The audio system according to claim 1, wherein
   the audio content narrowing unit accepts a selection regarding an attribute of a song as the selection regarding the attribute of the audio content from a user, and narrows the audio files stored in the connected portable audio player down to an audio file that contains audio data of a song having the selected attribute so as to set the narrowed audio file as the processing target audio content, and wherein
   the attribute of the song includes at least one of a musical genre to which the song belongs, an artist name of the song, a title of an album including the song, and a title of the song.

4. The audio system according to claim 1, wherein
   the audio content narrowing unit accepts a selection regarding a name of a playlist as the selection regarding the attribute of the audio content from a user, and narrows the playlists stored in the connected portable audio player down to a playlist having the selected playlist name so as to set the narrowed playlist as the processing target audio content.

5. The audio system according to claim 1, further comprising:
   a playback controlling unit configured to cause the connected portable audio player to play back the audio contents;
   wherein the preset information registering unit is configured to register, in response to a user preset registration operation, an attribute of an audio content currently played back by the connected portable audio player as preset information; and
   the preset playback controlling unit is configured to cause, in response to a user preset playback operation, the portable audio player to play back an audio content having the attribute that is registered as the preset information.

6. The audio system according to claim 5, wherein
   the preset information registering unit registers, in response to the user preset registration operation, an attribute of a song whose audio data is contained in the audio file currently played back by the portable audio player as the attribute of the audio content currently played back by the portable audio player, and wherein
   the preset playback controlling unit causes, in response to the user preset playback operation, the portable audio player to play back an audio file that contains audio data of a song having the attribute that is registered as the preset information.

7. The audio system according to claim 5, wherein
   the preset information registering unit registers, in response to the user preset registration operation that is performed while the portable audio player is playing back a playlist, a name of the playlist currently played back by the portable audio player as the attribute of the audio content currently played back by the portable audio player that is registered as the preset information, and wherein
   the preset playback controlling unit causes, in response to the user preset playback operation, the portable audio player to play back a playlist having the name that is registered as the preset information.

8. The audio system according to claim 5, wherein the audio system is mounted in a vehicle.

9. The audio system according to claim 1, wherein the audio system is connectable to a plurality of portable audio players that store audio files or both audio files and playlists of the audio files as audio contents, and that play back the stored audio contents, and the audio system further comprises:
   a preset information storing unit configured to store, for each of the plurality of portable audio players, preset information in which content identification information that specifies a specific audio content stored in the portable audio player is registered in association with player identification information that specifies the portable audio player;
   a connected player identifying unit configured to identify the portable audio player connected to the audio system; and
   a preset registering unit configured to associate, in response to a user preset registration operation, the content identification information that specifies the audio content selected by a user from the audio contents stored in the connected portable audio player with the player identification information that specifies the portable audio player identified by the connected player identifying unit, and to register the content identification information and the associated player identification information in the preset information;
   wherein the preset playback controlling unit is configured to cause, in response to a user preset playback operation, the connected portable audio player to play back an audio content specified by the content identification information that is registered in the preset information in association with the player identification information that specifies the portable audio player identified by the connected player identifying unit.

10. The audio system according to claim 9, further comprising:
a user identifying unit configured to identify a user currently using the audio system, wherein
the preset information storing unit stores, for each user of the audio system, the preset information in association with user identification information that specifies the user, and wherein
the preset registering unit associates, in response to the user preset registration operation, the content identification information that specifies the audio content selected by the user from the audio contents stored in the connected portable audio player with the player identification information that specifies the portable audio player identified by the connected player identifying unit, and registers the content identification information and the associated player identification information in the preset information that is associated with the user identification information that specifies the user identified by the user identifying unit, and wherein
the preset playback controlling unit causes, in response to the user preset playback operation, the connected portable audio player to play back the audio content specified by the content identification information registered in association with the player identification information that specifies the portable audio player identified by the connected player identifying unit in the preset information that is associated with the user identification information that specifies the user identified by the user identifying unit.

11. The audio system according to claim 9, wherein the audio system is mounted in a vehicle.

12. The audio system according to claim 1, wherein
the preset information registering unit is configured to register, in response to a user preset registration operation, content identification information that specifies an audio content selected by a user from the audio contents stored in the connected portable audio player as preset information;
the preset playback controlling unit is configured to cause, in response to a user preset playback operation, the connected portable audio player to play back an audio content specified by the content identification information that is registered as the preset information; and
the audio system further comprises a preset information invalidating unit configured to invalidate the preset information if the audio contents stored in the connected portable audio player have changed.

13. The audio system according to claim 12, wherein the audio system is mounted in a vehicle.

14. The audio system according to claim 1, wherein the audio system is mounted in a vehicle.

15. A playback controlling method for an audio system connectable to a portable audio player, which stores audio files or both audio files and playlists of the audio files as audio contents, and which plays back the stored audio contents, to control the playback performed by the connected portable audio player, the method comprising the steps of, in the audio system:
receiving menu information of audio contents in a portable audio player connected to the audio system;
narrowing the audio contents stored in the portable audio player connected to the audio system down to a processing target audio content in accordance with an attribute of the audio content selected by a user and based on menu information received by the audio system from the connected portable audio player;
registering, in response to a user preset registration operation, a narrowing procedure performed at the narrowing step as preset information; and
performing, in response to a user preset playback operation, a narrowing procedure equivalent to the narrowing procedure that is registered as the preset information, and causing the portable audio player connected to the audio system to play back the audio content narrowed down from the audio contents stored in the connected portable audio player.

16. The playback controlling method according to claim 15, further comprising the steps of:
causing the connected portable audio player to play back the audio contents;
registering, in response to a user preset registration operation, an attribute of an audio content currently played back by the connected portable audio player as preset information; and
causing, in response to a user preset playback operation, the portable audio player to play back an audio content having the attribute that is registered as the preset information.

17. The playback controlling method according to claim 16, wherein the audio system is mounted in a vehicle.

18. The playback controlling method according to claim 15, wherein the audio system is connectable to a plurality of portable audio players that store audio files or both audio files and playlists of the audio files as audio contents, and that play back the stored audio contents, the method further comprising the steps of:
identifying the portable audio player connected to the audio system;
associating, in response to a user preset registration operation, content identification information that specifies an audio content selected by a user from the audio contents stored in the connected portable audio player with player identification information that specifies the identified portable audio player, and registering the content identification information and the associated player identification information as the preset information; and
causing, in response to a user preset playback operation, the connected portable audio player to play back an audio content specified by the content identification information that is registered as the preset information in association with the player identification information that specifies the connected portable audio player.

19. The playback controlling method according to claim 15, further comprising the steps of:
registering, in response to a user preset registration operation, content identification information that specifies an audio content selected by a user from the audio contents stored in the connected portable audio player as preset information;
retrieving, in response to a user preset playback operation, an audio content specified by the content identification information that is registered as the preset information from the audio contents stored in the connected portable audio player, and causing the portable audio player to play back the retrieved audio content; and
invalidating the preset information if the audio contents stored in the connected portable audio player have changed.

20. The playback controlling method according to claim 15, wherein the audio system is mounted in a vehicle.

* * * * *